(12) United States Patent
Sangroniz et al.

(10) Patent No.: US 7,512,124 B2
(45) Date of Patent: Mar. 31, 2009

(54) MULTICAST OPTIMIZATION IN A VLAN TAGGED NETWORK

(75) Inventors: Robert Leon Sangroniz, Sandy, UT (US); Jeremy Lynn Garff, Sandy, UT (US); Mark Armand Fine, Salt Lake City, UT (US); Jeffrey Glenn Thomas, Draper, UT (US)

(73) Assignee: Alcatel Lucent, Paris (FR)

( * ) Notice: Subject to any disclaimer, the term of this patent is extended or adjusted under 35 U.S.C. 154(b) by 722 days.

(21) Appl. No.: 10/714,384

(22) Filed: Nov. 14, 2003

(65) Prior Publication Data

US 2004/0125803 A1    Jul. 1, 2004

Related U.S. Application Data

(60) Provisional application No. 60/437,214, filed on Dec. 31, 2002.

(51) Int. Cl.
*H04L 12/56* (2006.01)
(52) U.S. Cl. .......................... 370/390; 370/392; 370/400
(58) Field of Classification Search ........................ None
See application file for complete search history.

(56) References Cited

U.S. PATENT DOCUMENTS

| | | | |
|---|---|---|---|
| 6,614,787 B1 * | 9/2003 | Jain et al. ................... | 370/390 |
| 6,839,348 B2 * | 1/2005 | Tang et al. ................... | 370/390 |
| 6,847,638 B1 * | 1/2005 | Wu et al. ..................... | 370/389 |
| 2003/0012202 A1 * | 1/2003 | Fukutomi .............. | 370/395.52 |
| 2003/0079040 A1 * | 4/2003 | Jain et al. .................... | 709/238 |

* cited by examiner

*Primary Examiner*—Edan Orgad
*Assistant Examiner*—Jung Park

(57) ABSTRACT

A method and apparatus for optimizing multicast traffic in a VLAN-tagged environment is disclosed. The method, implemented by a cross-VLAN switching device, comprises the steps of receiving a multicast stream within a first VLAN of a plurality of VLANs configured thereon, and internally distributing the multicast stream towards substantially all the multicast group members registered at the cross-VLAN switching device to receive the multicast stream. Distribution of the multicast stream preferably comprises the steps of internally routing the multicast stream from the first VLAN to each VLAN in which there is a multicast group member registered to receive the multicast stream and then switching the multicast stream from each VLAN in which it is present in a cross-VLAN switching device to substantially all of the multicast group members registered to receive the multicast stream. In accordance with the invention, only a single copy of a multicast stream propagates across said one or more VLAN-tagged communications links, thereby avoiding one or more duplicative multicast streams that generally occur when there are multicast group members in a plurality of VLANs.

11 Claims, 10 Drawing Sheets

MULTICAST OPTIMIZATION IN A VLAN TAGGED NETWORK

CROSS-REFERENCE TO RELATED APPLICATION

This application claims the benefit of U.S. provisional application 60/437,214, filed Dec. 31, 2002, the contents of which is hereby incorporated herein by reference for all purposes.

BACKGROUND

The present invention generally relates to a system and process for distributing a multicast data stream in a network. In particular, the invention pertains to a novel switching device and method for efficiently more directly distributing multicast streams to multicast group members in a local area network, for example, without forwarding the multicast stream to the root router, thereby obviating the multicast streams that traverse the same 802.1Q links multiple times.

Multicast was designed to eliminate unnecessary packet replication across a network. The advantages of multicast are lost, however, when deployed in an environment with virtual local area network (VLAN) tagging. VLAN tagging, including 802.1Q VLAN tagging, is becoming widely used in today's networks, particularly large campus network configurations and VLANs spanning multiple geographical areas. In these environments, switches and combination switch/routers are frequently configured to support a plurality of host computers associated with different VLANs. With VLAN tagging, it is possible to use a single communications link that is shared by a plurality of VLANs without compromising the integrity of the separate and distinct VLANs. As a result, multicast streams may be transmitted multiple times over the same VLAN tagged link, thereby consuming system resources and bandwidth.

The disadvantage of multicast over VLAN tagged links may be demonstrated in a network including multiple VLANs, as illustrated in FIG. 1. The network 100 includes a router 102 that is operatively coupled to a plurality of switches 104, 105, and 106 by means of communication links 114, 115, and 116, respectively. Coupled to each switch is one or more host computers, including hosts H1 120 through H2 122, hosts H3 123 through H4 124, and H5 125 through H6 126 operatively coupled to first switch 104, second switch 105, and third switch 106, respectively. The switches 104-106 are preferably configured to support host computers that may belong to one or more VLANs, including VLAN-A and VLAN-B, as illustrated with parenthetical references. First switch 104 for example may support host H1 120 on VLAN-A and host H2 122 on VLAN-B. The router 102 and switches 104-106 are configured with a VLAN tagging protocol such as 802.1Q, thereby allowing each of the trunk links 114, 115, and 116 to transmit frames associated with VLAN-A and VLAN-B without compromising the integrity of the VLANs.

Each of the nodes of the network 100 preferably support multicast frames in accordance with IP Multicast. Router 102 preferably maintains a multicast membership table with which the router tracks various multicast group identifications, the IP source address of one or more nodes generating a multicast flow, and the location or identity of one or more host computers that has requested receipt of a multicast stream. The VLAN members are then multicast sources and receivers for various multicast streams.

The contemporary approach to distributing a multicast stream generated by a client H1 of VLAN A is to switch the stream through switch 104 to router 102. The router 102 maintains multicast group information preferably including the multicast address of one or more flows and the IP source address of each flow. When a client computer requests receipt of the multicast stream, the stream is forwarded from the router 102 through one or more switches to the requesting client computer. If the client is, for example, client computer H4 of VLAN B, the stream with a VLAN B tag is directed through trunk 115 to switch 105 before being switched to the client H4. Additionally, if the client H3 of VLAN A also requests to receive the same multicast stream, an additional copy of the stream with a VLAN A tag is also directed through trunk 115 to switch 105. The propagation path of a multicast stream from client H1 to clients H3 and H4 thus requires the stream be transmitted across switch 104, through the trunk 114, through router 102, twice across trunk 115 and twice through switch 105. The complete path from client H1 to clients H3 and H4 therefore consumes unnecessary bandwidth on trunk 115.

There is therefore a need for a system and method to eliminate the wasted bandwidth and increased latency associated with multicast flows in a VLAN tagged environment.

SUMMARY

The preferred embodiment of the present invention features a multicast optimization method comprising the steps of receiving a multicast stream from within a first VLAN of a plurality of VLANs supported by a cross-VLAN switching device; and distributing the multicast stream towards substantially all the multicast group members in each of the plurality of VLANs that are registered to receive the multicast stream. With the present invention, only a single copy of a multicast stream need traverse a VLAN-tagged communications link, thereby avoiding the need to propagate duplicative multicast streams across said links to multicast group members in the plurality of VLANs. Duplicate multicast packets are detected and discarded at a switching device prior to being transmitted over the VLAN-tagged link, regardless of the VLAN of the server or the subscriber. The present invention thereby reduces the load on the various nodes and trunks.

The step of distributing the multicast stream to substantially all the multicast group members preferably comprises the steps of internal routing the multicast stream from the first VLAN, i.e. the VLAN in which the multicast stream is received, to each VLAN in which there is a multicast group member registered to receive the multicast stream, and subsequently switching the multicast stream in each VLAN in which it is present, including those VLANs to which the stream routed, towards substantially all of the multicast group members registered to receive the multicast stream. The step of internally routing the multicast stream between VLANs may further include convention layer 3 routing operations including the step of decrementing the time-to-live counter of the packets of the multicast stream.

In order to receive a multicast stream, a multicast group member in the preferred embodiment registers a subscription to the multicast stream using a multicast declaration message, such as an Internet Group Membership Protocol (IGMP) Membership Report message, for example. The registrations are preferably recorded by the cross-VLAN switching device in one or more VLAN/multicast group membership tables, which generally include or otherwise associate a multicast address and the Internet Protocol (IP) address of the one or more multicast group members that subscribe to the multicast stream.

In the preferred embodiment, all the multicast declaration messages received by a cross-VLAN switching device are used to register the group members from which the declaration messages originate or otherwise update the one or more VLAN/multicast group membership tables. In contrast to the prior art, however, a cross-VLAN switching device is preferably adapted to forward only the first of a series of multicast declaration messages, independent of the VLAN on which the multicast declaration message was received. By withholding duplicate multicast declaration messages, the cross-VLAN switching device of the preferred embodiment prevents duplicate multicast streams from propagating across VLAN-tagged communications links, including 802.1Q communications links.

At such time a registered multicast group member needs to de-register its subscription, the client transmits a leave message to rescind the subscription to the associated multicast stream. Upon receipt of each of the one or more leave messages, preferably an IGMP Leave messages, the cross-VLAN switching device removes the appropriate entry in the VLAN/multicast group membership table. In the case of the last leave message, i.e. the leave message of the last registered multicast group member, the switching device also forwards the leave message towards the upstream router so that it may discontinue transmission of the multicast stream to the cross-VLAN switching device. To preserve the symmetry between declaration and leave messages, the last leave message preferably includes the same VLAN identification as that used in the first declaration message forwarded from the cross-VLAN switching device toward the upstream router, irrespective of the actual VLAN association of the last multicast member.

In another preferred embodiment, the multicast optimization method comprises a registration processing method and a multicast stream processing method. The registration processing method comprises the steps of receiving a plurality of multicast declaration messages specifying a first multicast group identification, the multicast declaration messages originating from multicast group members associated with a plurality of VLANs; registering each of the plurality of multicast group members from which the multicast declaration messages originated; and forwarding only the first multicast declaration message of the plurality of multicast declaration messages to an upstream router. The multicast stream processing method comprises the steps of receiving a multicast stream, having said first multicast group identification, from a multicast group member associated with a first VLAN of the plurality of VLANs; switching the multicast stream towards substantially all of the zero or more multicast group members associated with the first VLAN that are registered to receive the multicast stream; and distributing the multicast stream towards substantially all of the zero or more multicast group members associated with the one or more VLANs outside of the first VLAN. As such, the number of duplicate multicast streams that propagate across said one or more VLAN-tagged links is minimal.

The step of distributing the multicast stream towards substantially all of the zero or more multicast group members preferably comprises the steps of routing the multicast stream from the first VLAN to each of the one or more VLANs outside of the first VLAN associated with the zero or more multicast group members, and switching the multicast stream from the cross-VLAN switching device to substantially all the zero or more multicast group members associated with the one or more VLANs outside of the first VLAN.

The multicast optimization method may further include the step of switching substantially all unicast packets received at the cross-VLAN switching device to each of the nodes specified in the respective unicast packet, without performing any other OSI layer 3 routing procedures.

In another preferred embodiment, the cross-VLAN switching device comprises a management module comprising one or more VLAN/multicast group membership tables for registering multicast group membership subscriptions; and a packet forwarding engine for switching unicast packets within each of the plurality of VLANs and routing one or more multicast packets between the plurality of VLANs in accordance with the multicast group membership subscriptions of the one or more VLAN/multicast group membership tables. As such, transmission of one or more duplicative multicast packets over VLAN tag-aware communications links is minimal.

DESCRIPTION

Figure 1:
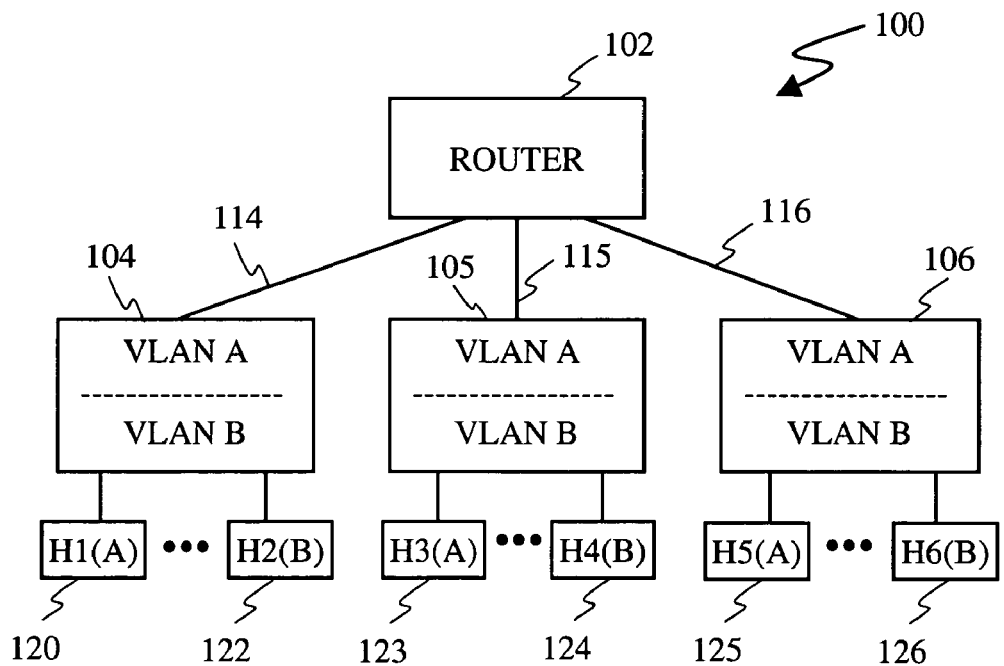
FIG. 1 is a VLAN-tagged network topology with which the invention may be implemented, according to the preferred embodiment of the present invention.
Figure 2:
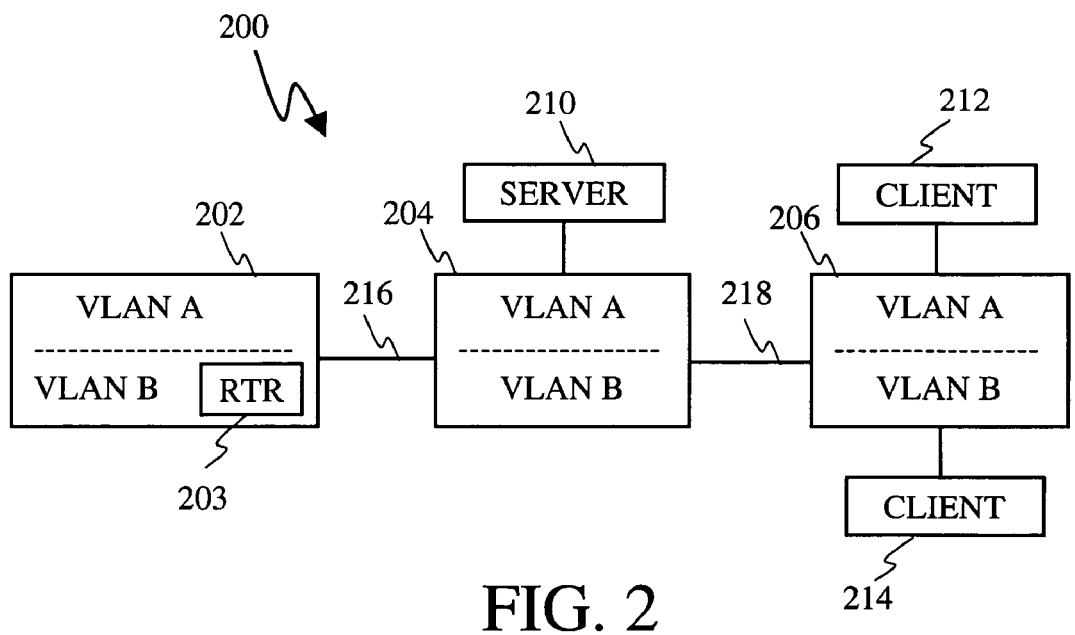
FIG. 2 is a VLAN-tagged network topology with which the invention may be implemented, according to the preferred embodiment of the present invention.

Referring to FIG. 2, a VLAN-tagged network topology with which the preferred embodiment may be implemented is illustrated. The subnet 200 includes a plurality of cross-VLAN switching devices (CVSDs) including first CVSD 202, second CVSD204, and third CVSD206. CVSDs 202, 204, 206 perform multicast signaling and traffic control within and between VLANs. CVSDs 202, 204, 206 may be embodied in an 802.1Q-enabled Open Systems Interconnect (OSI) layer 2 switch, an OSI layer 3 router, or a modern enterprise/LAN switch that perform both OSI layer 2 switching within VLANs and OSI layer 3 routing between a plurality of VLANs configured on the device. In the preferred embodiment, the first CVSD 202 is a LAN switch that includes router 203 functionality for performing traditional unicast routing operations between the VLANs configured thereon. The second CVSD 204 and third CVSD 206 preferably support conventional unicast switching operations within VLANs configured thereon.

The first CVSD 202 and second CVSD 204 are operatively coupled to each other by means of communication link 216, while the second CVSD 204 and third CVSD 206 are operatively coupled by communication link 218. The communication links 216 and 218 in this embodiment convey the signaling and data for a plurality of VLANs using wire or wireless communication mediums including twisted-pair, fiber optic, radio frequency, or infrared links.

Coupled to each of the CVSDs 202, 204, and 206 is one or more hosts or stations which may included one or more multicast group members. In this embodiment, the second CVSD 204 is coupled to a multicast server 210 that generates a multicast stream, and the third CVSD 206 is coupled to a plurality of clients 212 and 214 that subscribe to the multicast stream generated by the server 210. The multicast server 210 and multicast clients 212, 214 constitute a multicast group identified by a multicast address generally assigned by a higher-layer protocol or application operating on one of the multicast group devices. The multicast stream, in turn, comprises one or more multicast packets.

Each of the stations in FIG. 2 is a member of one or more VLANs, such as VLAN-A and VLAN-B in this embodiment. In particular, the server 210 and first client 212 are members of VLAN-A, while second client 214 is a member of VLAN-B. In this example, the server 210, first client 212, and second client 214 are all members of a common multicast group and therefore exchange multicast traffic or multicast stream in addition to conventional unicast traffic.

To support the plurality of VLANs using communications links 216 and 218, each of the CVSDs 202, 204, and 206 in the preferred embodiment are preferably VLAN-tag-aware. As such, traffic that traverses the communications links 216 and 218 is generally tagged in order to differentiate traffic with respect to VLAN. In the preferred embodiment, the VLAN-tagging protocol as defined by IEEE 802.1Q uses a VLAN identifier (VID) to track the VLAN membership information between nodes.

In prior art switches and switch routers, unicast and multicast traffic is strictly confined to a particular VLAN within a switch even if the switch is connected to a multicast group member present in a different VLAN than that of the multicast traffic. As such, all multicast traffic was necessarily forwarded to an Open Systems Interconnect (OSI) layer 3 routing device before the multicast stream would traverse from one VLAN into another.

In contrast to the prior art, multicast traffic in the present embodiment can cross over from one VLAN to another VLAN at a CVSD without propagating through an OSI layer 3 routing device. Allowing multicast traffic to penetrate the VLAN boundary at the CVSD reduces demand on system resources by preventing multicast traffic from being transmitted upstream to the router at the root of the spanning tree and back down again across the same VLAN-tagged communication links. In the preferred embodiment, the isolation of unicast traffic within each VLAN is preserved.

The novel functionality of a CVSD is made possible in some embodiments by one or more VLAN/multicast group membership (VMGM) tables. A VMGM table preferably maintains a record of the multicast address and IP source address of each of the multicast flows for each of the 802.1Q-enabled ports on the CVSD. The multicast flows are cross-referenced with the VLAN identifications associated with one or more VLANs supported by the corresponding switch. The VMGM table preferably also maintains a record of multicast subscription information, which is updated upon receipt of the declaration messages used to notify the CVSD of multicast flow registration requests, for example.

In the preferred embodiment, the second CVSD 204 and third CVSD 206 each include a VMGM table. In some other embodiments, the first switching device 202 may also include a VMGM table, although it is not strictly necessary because of the presence of the router 203 that already performs inter-VLAN multicast switching. In the router 203, the VMGM table preferably augments or replaces one or more existing tables with which the router 203 tracks various multicast group identifications, the identity of multicast flow sources, and identity of one or more multicast stream recipients.

Although a VMGM table of the preferred embodiment represents a single record, one skilled in the art will recognize that the same result may be achieved using a plurality of separate VMGM tables for each VLAN configured on the switching devices, each of the tables being consulted for purposes of distributing multicast traffic between VLANs supported therein.

Figure 3A:
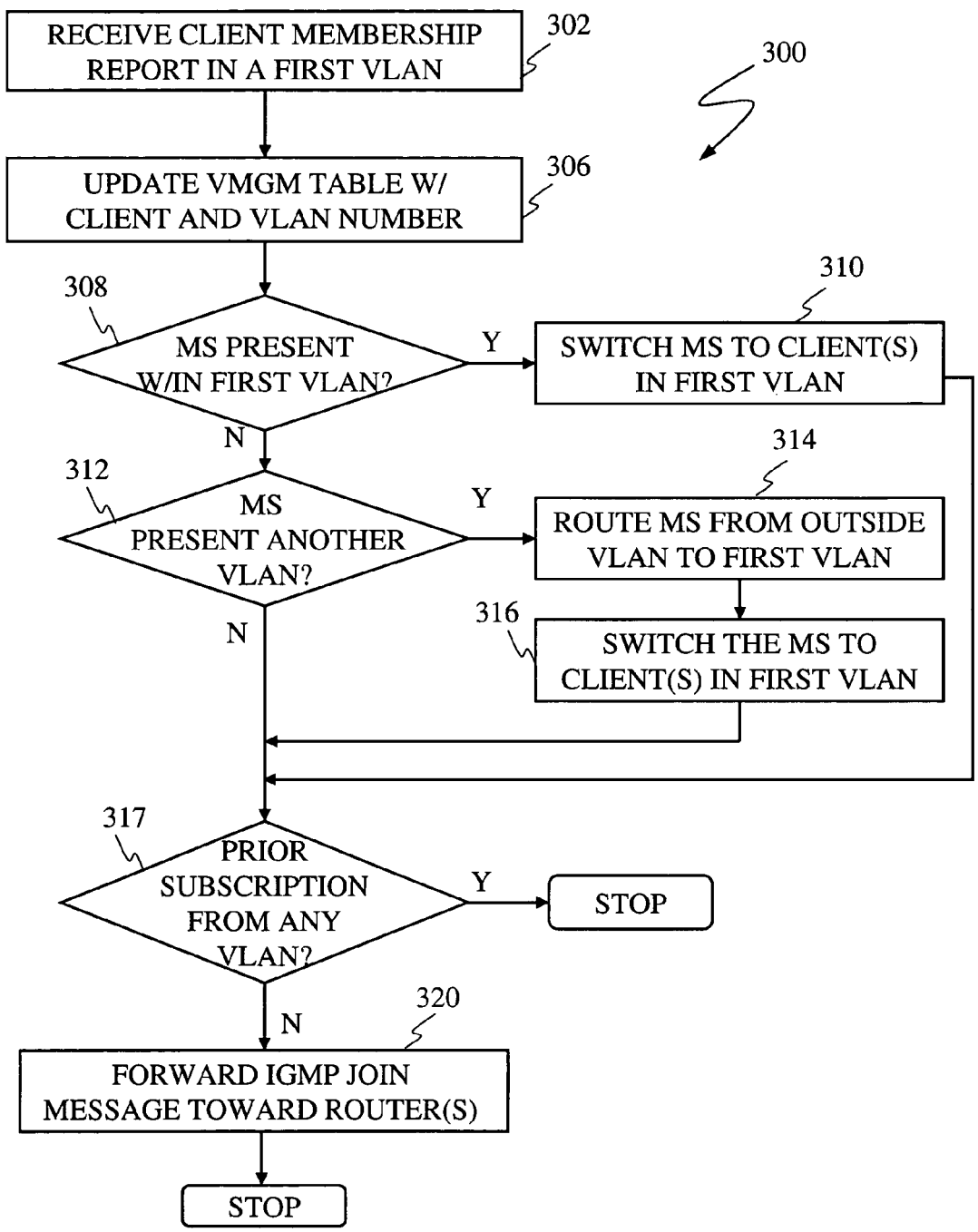
FIG. 3A is a flow chart of the method of the method by which a cross-VLAN switching device processes the multicast declaration message of clients of two or more VLANs, according to the preferred embodiment of the present invention.

Illustrated in FIG. 3A is a flow chart of the method by which a CVSD processes the multicast streams subscription requests of clients of two or more VLANs.

To subscribe to a multicast stream, a client generates a multicast declaration message to request receipt of the multicast stream. In the preferred embodiment, the multicast declaration message is an IGMP Membership Report message including the particular VLAN identification of the client that generated the Membership Report message. The multicast declaration message is preferably transmitted in the direction of the router 203 in the particular VLAN associated with the client.

Upon receipt of the IGMP Membership Report message in the receiving step 302, the CVSD updates its VMGM table by recording the client's subscription to the multicast stream identified by a multicast address, as illustrated in updating step 306. The IP address of the client as well as the VLAN number associated with the client are recorded. In some embodiments, the VMGM further includes a priority marker to indicate whether the declaration from the client was the first declaration received at the CVSD. The priority marker may take the form of a bit that is toggled on or off, or a time stamp with which a plurality of subscription requests may be distinguished.

Next, the CVSD consults the one or more VMGM tables to determine if the multicast stream is available for distribution to the requesting device. The CVSD first tests for the presence of the multicast stream within the same VLAN, as illustrated by intra-VLAN testing step 308. If the multicast stream is present in the same VLAN in which the Membership Report message is received, the intra-VLAN testing step 308 is answered in the affirmative and the multicast stream forwarded to the requesting device, as illustrated in MS switching step 310. If the multicast stream is not present on the switch 206 in the VLAN in which the multicast stream was generated the intra-VLAN testing step 308 is answered in the negative.

If the multicast stream is not present within the VLAN, the CVSD tests for the presence of the multicast stream within any of the remaining VLANs for which the CVSD is configured, as illustrated in the inter-VLAN testing step 312. In the preferred embodiment, the inter-VLAN testing step 312 checks for the presence of the multicast stream in all VLANs supported by the third CVSD 206, excluding that of the requesting client. If the CVSD determines that the multicast stream is available in another VLAN, the inter-VLAN testing step 312 is answered in the affirmative and the multicast stream is directed from the VLAN in which it is found to the VLAN in which it is requested. As illustrated in MS routing step 314, a multicast stream associated with or otherwise present in VLAN-B, for example, may be routed from VLAN-B to VLAN-A where it may then be switched to the subscribing client in VLAN-A, as illustrated in the switching step 316.

In the preferred embodiment, the MS routing step 314 comprises one or more conventional routing procedures, including decrementing the time-to-live indicator, for example. Of course, one skilled in the art will recognize that the multicast stream may be internally switched from one VLAN toward a requesting client in a different VLAN without the need for any processing typically associated with a routing protocol.

As a general rule, a CVSD forwards the multicast declaration message upstream towards the router unless there is a prior subscription for that stream registered at the CVSD. Subsequent multicast declaration messages generated within any of the VLANs are generally abandoned so as to prevent duplicate multicast streams from being conveyed across the same VLAN-tagged communications links.

As illustrated in the prior subscription test 317, the presence of a prior registered subscription in any VLAN for the same multicast stream will cause the IGMP Membership Report message from the client to be abandoned. It is unnecessary to forward a Membership Report message to the root router in the case of a prior subscription request within the same VLAN. According to the preferred embodiment, it is also unnecessary to forward a Membership Report message to the root router in the case of a prior subscription request outside the VLAN of the client because the multicast stream, when received by the CVSD in the other VLAN, will be routed from the other VLAN to the VLAN of the client that registered the subscription.

In the absence of any prior subscriptions for the multicast stream at the CVSD, the prior subscription test 317 is answered in the negative and the IGMP Membership Report message forwarded to the next switching device, if applicable, in the direction of one or more upstream routing devices. The process of forwarding to the membership report to the next upstream switching device is repeated in subsequent switches until the membership report reaches each of the one or more routing devices. Although a conventional switch will generally not be able to perform the cross-VLAN test and forwarding for a multicast stream as illustrated in steps 312 through 316, the efficient use of bandwidth will still be achieved in the present invention because the duplication of multicast traffic destined for different VLANs in an 802.1Q-enabled communication link is avoided. Any switching device found in the path toward the upstream router will be considered a router as the CVSD does not make the distinction between switches and routers.

The VLAN references used in FIG. 3A are intended for illustrative purposes only. In general, the references to a first VLAN are intended to represent operations that occur within a given VLAN from which the Membership Report message is received in receiving step 302. The membership report processing method 300 is equally applicable to each of the VLANs supported by a CVSD, including VLAN-A and VLAN-B of the preferred embodiment. One skilled in the art will recognize that a CVSD as presented in the preferred embodiment supports a plurality of VLANs, each of which is governed generally by the method 300 of FIG. 3A.

Figure 3B:
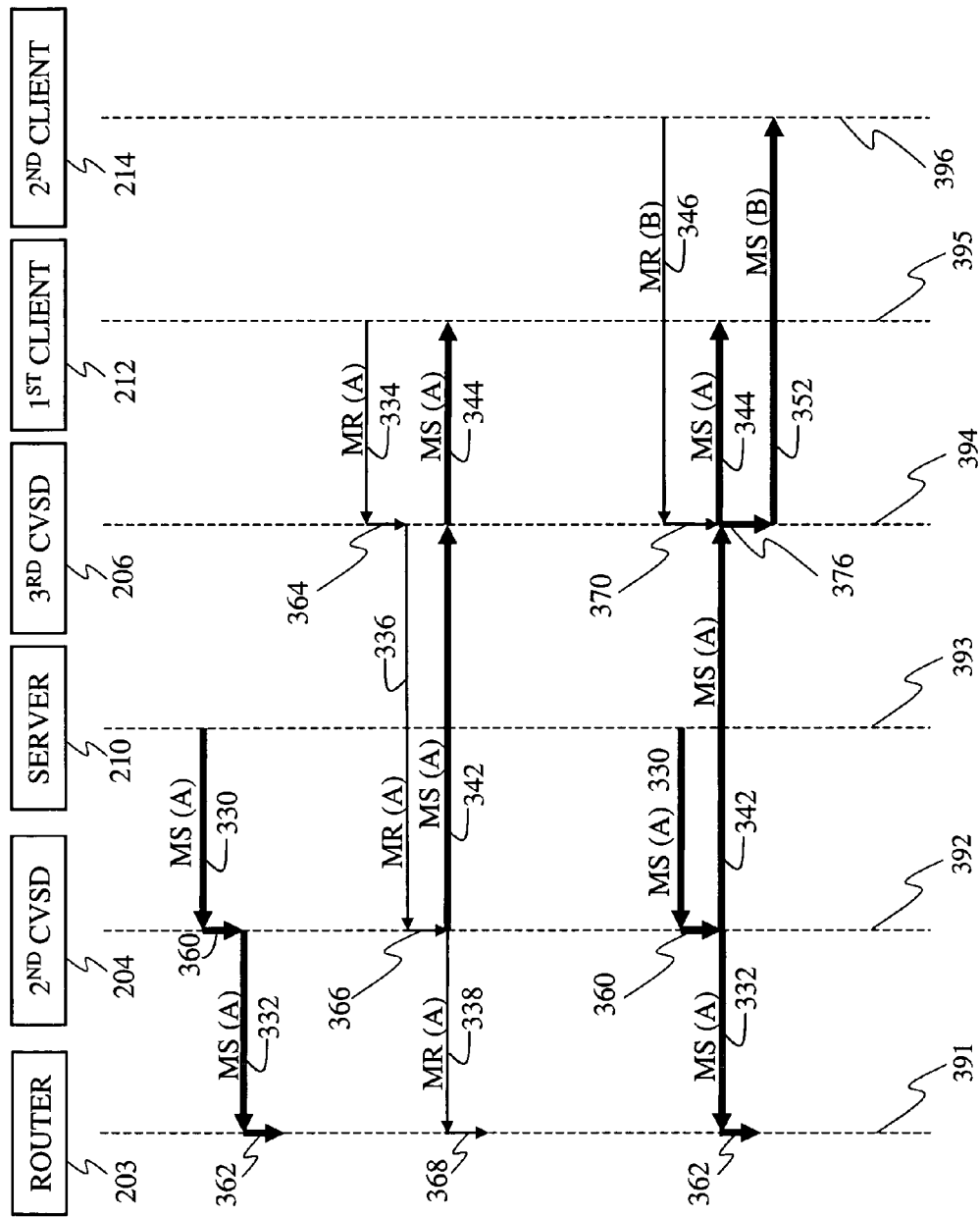
FIG. 3B is a chart of signaling and data flow in a system in which a first Membership Report message is received from within the VLAN and a second Membership Report message is received from outside the VLAN, according to the preferred embodiment of the present invention.
Figure 3C:
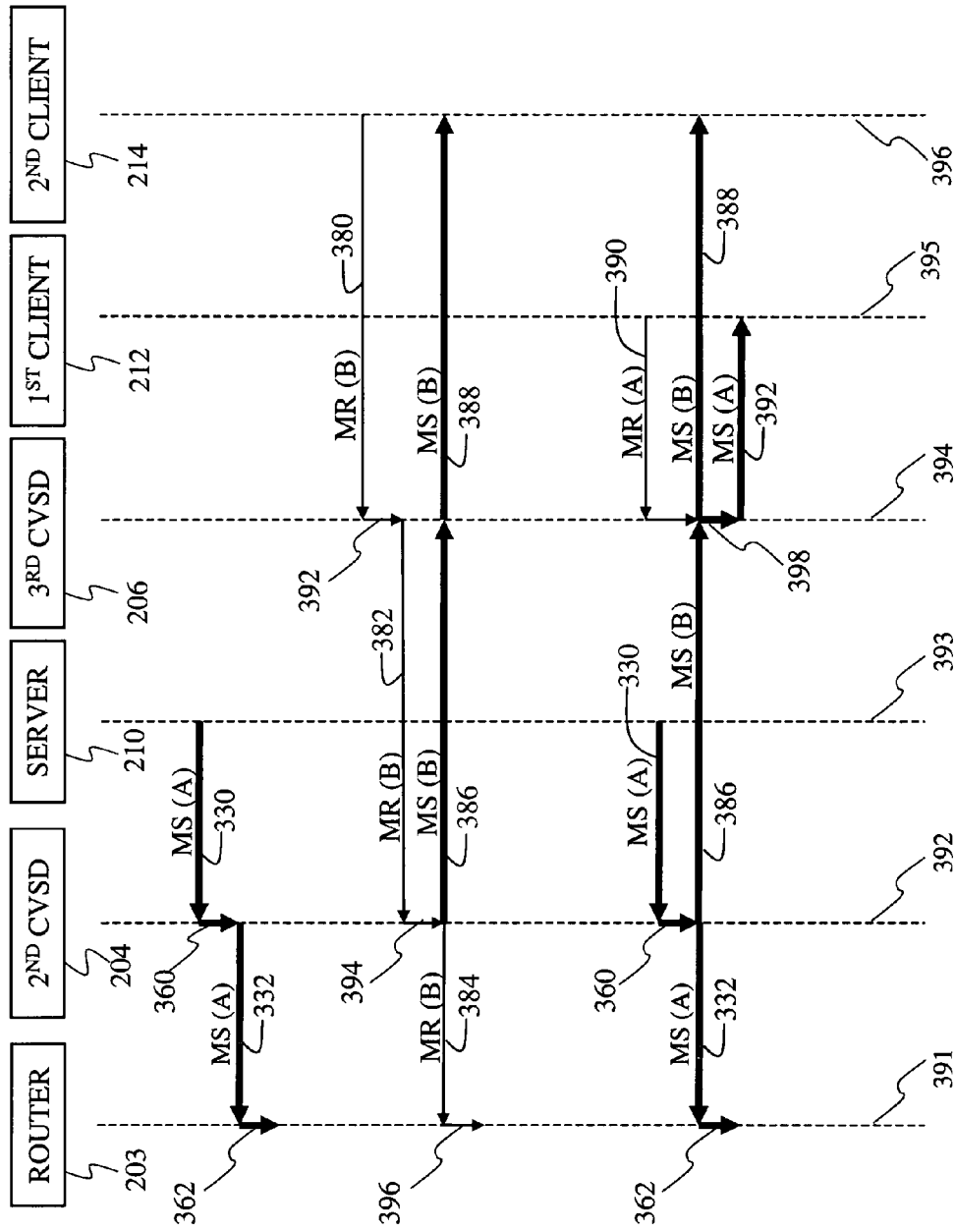
FIG. 3C is a chart of signaling and data flow in a system in which a first Membership Report message is received from outside the VLAN and a second Membership Report message is received from within the VLAN, according to the preferred embodiment of the present invention.

Application of the membership report processing method 300 of FIG. 3A is illustrated in FIGS. 3B and 3C, according to the preferred embodiment. In particular, the signaling and data flow diagram of FIG. 3B illustrates messages from within and outside the VLAN in which the multicast stream is generated. The Membership Report message from within the same VLAN, i.e. first VLAN, precedes a second Membership Report message from outside the VLAN.

A pre-existing multicast stream 330 is generated in this embodiment at the server 210 and forwarded to the adjacent switching device, second CVSD 204. The multicast stream 330 is generated by a higher level protocol or application running the server 210 within VLAN-A, as indicated by the parenthetical including, (A). The multicast stream 330 may be initiated at the server 210, or provided in response to another subscriber (not shown) on the network 200. The multicast stream 332 is generally forwarded to one or more upstream routers including router 203 in accordance with the spanning tree protocol. In the absence of any registered subscriptions, the multicast stream 332 is discarded or otherwise abandoned in the router 203, as illustrated by step 362.

Assume for purposes of illustration that a Membership Report message 334 is subsequently generated by a client in VLAN-A, as indicated by the MR (A). A Membership Report message 334 generated by the first client 212, for example, is forwarded to the third CVSD 206. Upon receipt, the third CVSD 206 consults its VMGM table to determine whether the multicast stream requested is present in the same VLAN, step 308, and then in the other VLAN-B, step 312. Since the multicast stream is not present on the third CVSD 206, the CVSD 206 determines whether to forward the Membership Report message upstream.

In general, the third CVSD 206 forwards a Membership Report message upstream only if it is the first Membership Report message received for that multicast stream. In the present example, the third CVSD 206 consults it VMGM table and determined that the client 212 is the first client in either VLAN-A or VLAN-B to issue such a request. As such, the IGMP Membership Report message 336 is forwarded upstream to the second CVSD 204. As before, the VMGM table in the second switching device 204 is consulted in step 366 to determine if the multicast stream requested is present. The second CVSD 204, detecting the presence of the multicast stream 330, generates the multicast stream 342, 344 that is transmitted back to the first client 212. Note that the IGMP Membership Report message 336, being the first Membership Report message received at the second CVSD 204, is forwarded in the form of Multicast Report 338 to the router 203. The router 203 registers the Membership Report message 338 in a local multicast group membership table in step 368.

Continuing with the example immediately above, if a second client 214 in VLAN-B requests the same multicast stream after the initial IGMP Membership Report message 334 from first client 212 propagates to the router 203, then the multicast stream declaration, preferably an IGMP Membership Report message 346, is transmitted toward the upstream router 203 and received by the third CVSD 206. In accordance with the intra-VLAN testing step 308 of FIG. 3A, the CVSD 206 consults its VMGM table to determine if the multicast stream is present within the VLAN, namely VLAN-B. The intra-VLAN testing step 308 is answered in the negative because the multicast stream 342 is generated by the server 210 in VLAN-A. The third CVSD 206 then consults the VMGM table to determine if the multicast stream is present in any other VLAN outside VLAN-B, namely VLAN-A. When the presence of the presence of the pre-existing multicast stream 342 is detected in the inter-VLAN testing step 312, the third CVSD 206 preferably routes the multicast stream 342 from VLAN-A to VLAN-B, as illustrated by step 376 in FIG. 3B and routing step 314 in FIG. 3A. Once in VLAN-B, the multicast stream 352 is switched directly to the second client 214.

In the preferred embodiment, the step 314 of routing a multicast stream between VLANs includes conventional routing operations including the step of decrementing the Time-to-Live indicator. One skilled in the art will recognize, however, that the multicast stream 342 in VLAN-A may be internally switched to VLAN-B without such processing. As one skilled in the art will recognize the present embodiment of the invention obviates the need to forward the IGMP Membership Report message 346 to the router 203. More importantly, it also obviates the need for a second multicast stream from the router 203 across the first communication link 216 and second communication link 218, which would unnecessarily double the traffic over these links.

Referring to FIG. 3C, a flow diagram of signaling and data flow in a system in which a first Membership Report message for a multicast stream from outside the VLAN precedes a second Membership Report message from within the VLAN is illustrated. As described above, the multicast stream 330 generated by a higher level protocol or application in VLAN-A, is forwarded to the second switching device 204. In turn, switching device 204 forwards the multicast stream 332 to the upstream router 202 where it is discarded in the absence of record of any registered subscriptions.

Assume for purposes of illustration that subsequent to the multicast stream 330, a first multicast stream request message is generated by a client outside the VLAN associated with the multicast stream 330. The request, preferably in the form of IGMP Membership Report message 380, is generated by the second client 214 in VLAN-B. The Membership Report message 380 is forwarded to the third CVSD 206, which consults the VMGM table for a prior subscription first within the VLAN-B and then in VLAN-A. In the absence of a prior subscriptions for the multicast stream 330, the Membership Report message 382 tagged for VLAN-B is forwarded towards the router 203 to second CVSD 204. Upon receipt, the second CVSD 204, consults its VMGM table to test to for the presence of the multicast stream 330 in VLAN-B. Although the test for the multicast stream within VLAN-B fails, the test for VLAN-A reveals the presence of the multicast stream 330. As prescribed by inter-VLAN testing step 312, the second CVSD 204 proceeds in accordance with routing step 314 to preferably route the multicast stream 330 from VLAN-A to VLAN-B. The multicast stream 386 tagged for VLAN-B is then switched to the third CVSD 206, and then to the second client 215, as indicated by multicast stream 388.

Continuing with the example immediately above, subsequent to the Membership Report message 380, another multicast stream request is made by a client in VLAN-A. Here, the request, preferably an IGMP Membership Report message 390, is generated by the first client 212 and forwarded to the third CVSD 206. When the third CVSD 206 consults its VMGM table, the presence of the multicast stream 330 is note detected despite the fact that it was originally generated in VLAN-A. Instead, the multicast stream 386 in VLAN-B is detected when the third CVSD consults its VMGM table for the stream in a VLAN outside of the that request. In particular, the third CVSD 206 identifies the multicast stream 386 in the course of testing for the stream in VLAN-B prescribed in the inter-VLAN testing step 312. In response, the multicast stream 386 is preferably routed from VLAN-B to VLAN-A in accordance with the routing step 314 and the resulting multicast stream 392 forwarded to the first client 212. As before, the present embodiment of the invention obviates the need to forward the IGMP Membership Report message to the router 203. It also obviates the need for a second multicast stream from the router 203 across the first communication link 216 and second communication link 218, which would unnecessarily double the traffic over these links.

Figure 4A:
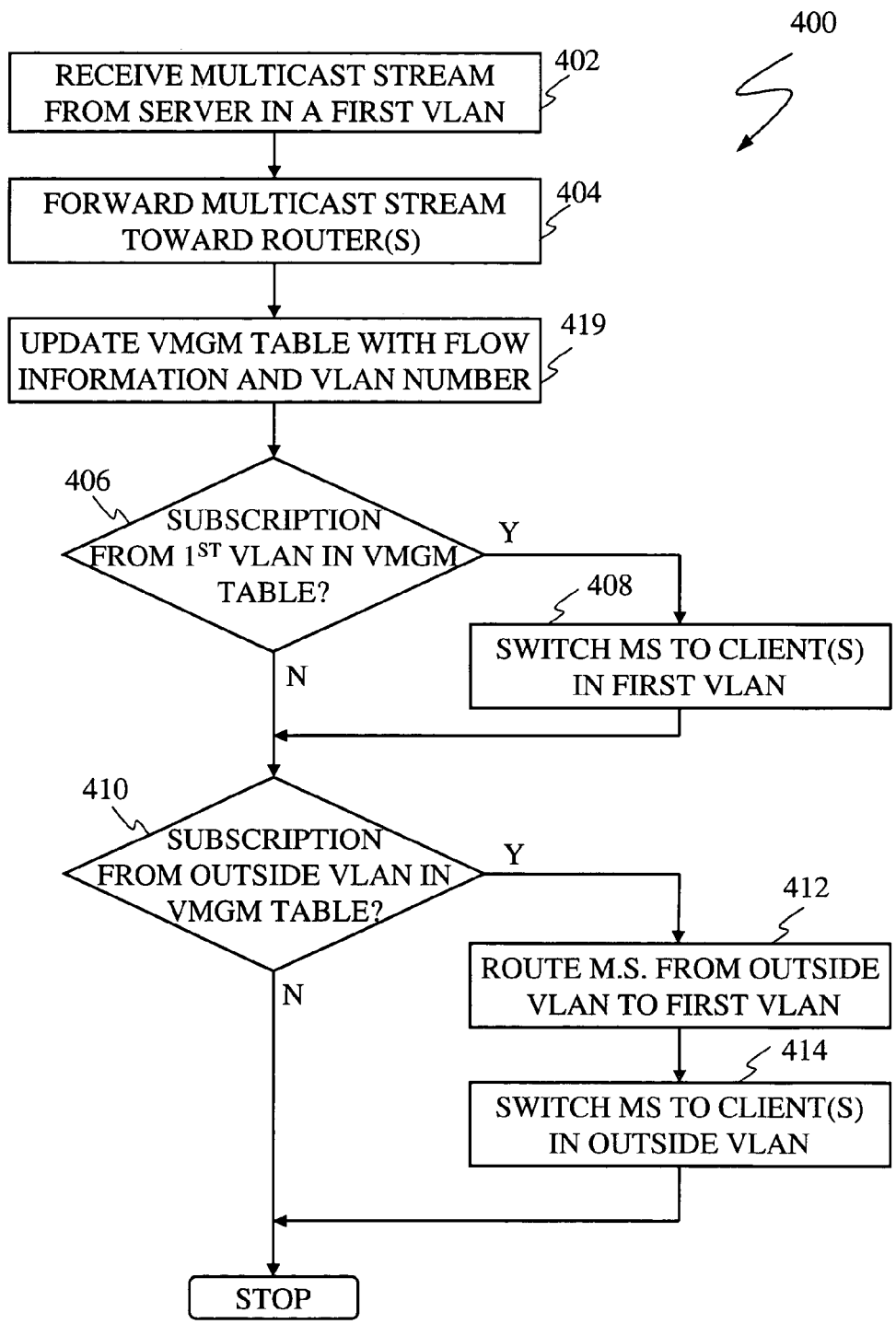
FIG. 4A is a flow chart of the method by which cli a multicast stream is processed in a cross-VLAN switching device, according to the preferred embodiment of the present invention.

Referring to FIG. 4A, a flow chart of the method by which a multicast stream is processed in a CVSD is illustrated. The multicast stream is typically generated by a higher-layer protocol or application at a server, transmitted toward the upstream routing device, and received by the adjacent CVSD, as illustrated by receiving step 402. The adjacent CVSD, in turn, forwards the multicast stream toward the upstream router, as illustrated in forwarding step 404. Upon receipt at the adjacent CVSD and any other intermediate CVSDs, the CVSD consults its VMGM table to test for the presence of any prior, outstanding requests for the multicast stream. The CVSD first tests for the stream within the same VLAN on which the request is received, i.e. the first VLAN, as indicated by the intra-VLAN testing step 406. In response to a registered request in the VMGM table, the CVSD causes the multicast stream to be switched to the requesting client, as illustrated in switching step 408.

The CVSD also tests for outstanding multicast stream requests in any other VLANs for which the CVSD is configured, i.e. those outside the VLAN associated with the requesting client. In response to an outstanding request in an outside VLAN, the inter-VLAN testing step 410 is answered in the affirmative and the CVSD preferably routes the multicast stream present in the first VLAN to the appropriate outside VLAN, as indicated in routing step step 412. Once in the appropriate VLAN, the multicast stream is switched to the one or more clients that requested the stream, as indicated in switching step 414. The process of testing for outstanding multicast stream subscriptions is repeated at each CVSD between the source of the multicast stream and the root router. Each CVSD in the data path preferably executes the multicast stream processing method of FIG. 4A. One skilled in the art will recognize that the method of FIG. 4A applies a CVSD with a plurality of VLANs, each of which is governed generally by the method of FIG. 4A in the preferred embodiment.

Figure 4B:
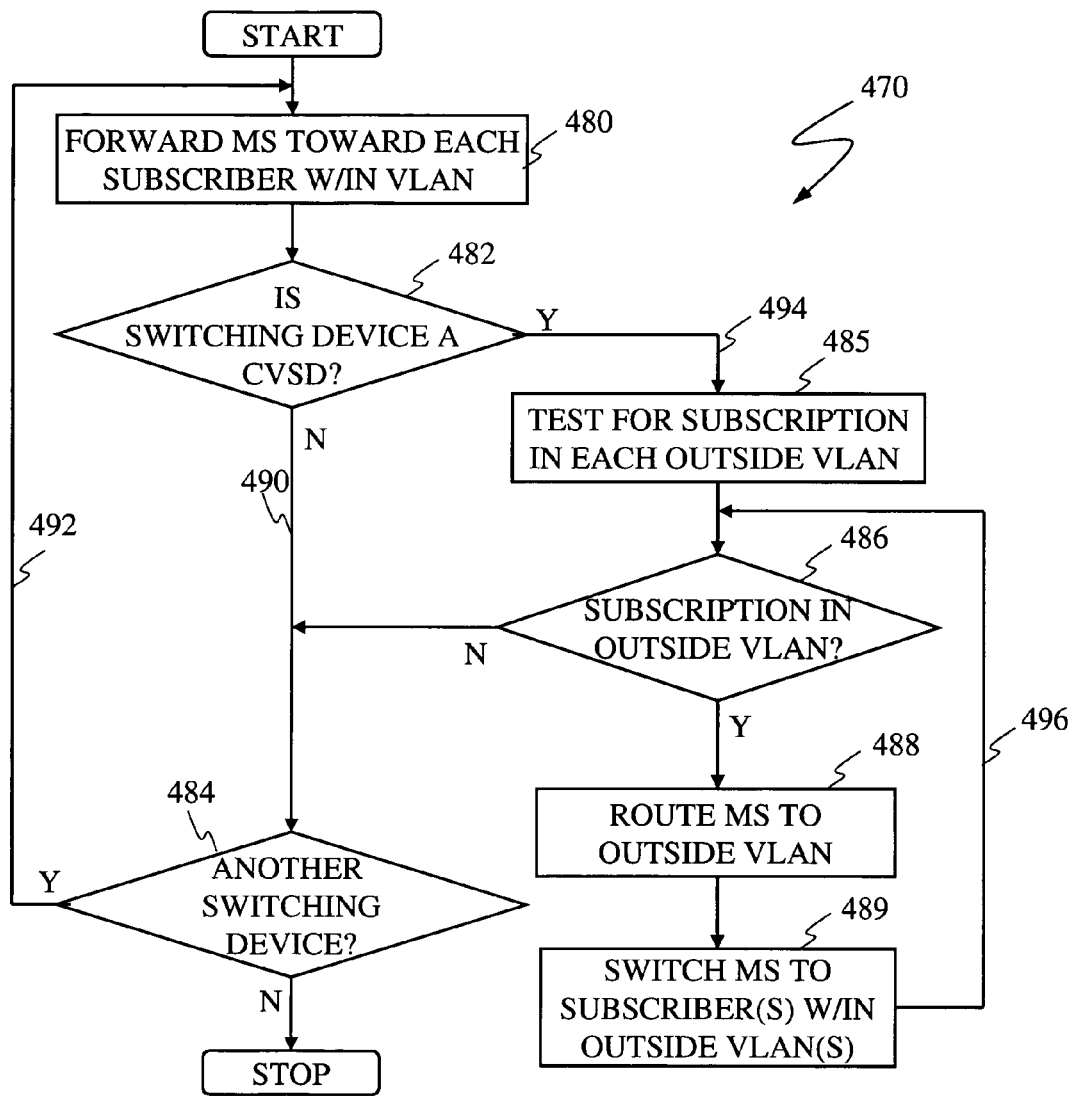
FIG. 4B is a flow chart of the method by which a multicast stream is distributed to clients in two or more VLANS, according to the preferred embodiment of the present invention.

Referring to FIG. 4B, a flow chart of the method by which a multicast stream is distributed after crossing from a first VLAN into one or more outside VLANs is illustrated. In particular, the flow chart of FIG. 4B illustrates the steps used to propagate a multicast stream to clients within a VLAN as well as clients outside that VLAN after the multicast stream is routed between VLANS as prescribed by the switching step 414 of FIG. 4A. The multicast stream switching process of FIG. 4B generally occurs in the downstream direction in the case that the multicast stream is generated upstream of one or more clients.

The multicast stream switching process in FIG. 4B is generally invoked after the multicast stream is routed from a first VLAN to an outside VLANs supported by the CVSD. Once received in the VLAN, the multicast stream is switched in step 480 towards each of the subscribers within the VLAN that is registered in the VMGM table. The subscribers may include clients that are directly connected to the CVSD, or indirectly connected to the CVSD by means of one or more intermediate switching devices. In the case of an intermediate CVSD, the CVSD should test for the presence of registered subscribers in VLANS outside of that on which the multicast stream is propagated in the downstream direction. This is necessary in the preferred embodiment to accommodate subscribers whose Membership Report messages were received only by this CVSD. As explained above, such a subscriber may be present on a different VLAN than that of the multicast stream at that node.

If the node to which the multicast stream is distributed is a conventional switch, i.e. non-CVSD, the CVSD testing step 482 is answered in the negative and the process proceeds according to path 490. If however, the node is a CVSD as described herein, the CVSD testing step 482 is answered in the affirmative and the method proceeds along path 494. In testing step 485, the present CVSD queries its VGMG table to identify the presence of any registered subscriptions in outside VLANs, i.e. VLANs other than that on which the multicast stream is received at that node.

In the preferred embodiment, VLAN-B is the only outside VLAN for a multicast stream received in VLAN-A, and vise versa. If there is an outstanding subscription to the multicast stream in the other one or more VLANs, outside VLAN subscription testing step 486 is answered in the affirmative and the multicast stream routed from the present VLAN to the VLAN in which the subscription is registered, as illustrated in the routing step 488. One skilled in the art will recognize that the test in step 485 is necessary in some embodiments of the present invention to detect the presence of addition multicast group members whose Membership Report messages were terminated in a CVSD due to a prior registered request. See explanation of step 476 of FIG. 4C below.

Once routed to the outside VLAN in routing step 488, the multicast stream is switched to one or more clients that have subscribed to the stream, as indicated in the switching step 489. The system of the present embodiment proceeds according to path 496, thereby causing the multicast stream to be switched within the other one or more VLANs in the manner described above.

If the particular device is not a CVSD as used herein, which would give rise to a negative result in the CVSD testing step 482, the multicast stream switching process proceeds to the switching device testing step 484. If the particular device at which the test is conducted is an edge switch, for example, the switching device testing step 484 is answered in the negative and the process ends with respect to that channel of multicast stream distribution. If, however, there are one or more additional devices between the present switching device and a subscribing client, switching device testing step 484 is answered in the affirmative and the system proceeds to return path 492 which causes the multicast stream to propagate in the direction of a subscribing client.

Figure 4C:
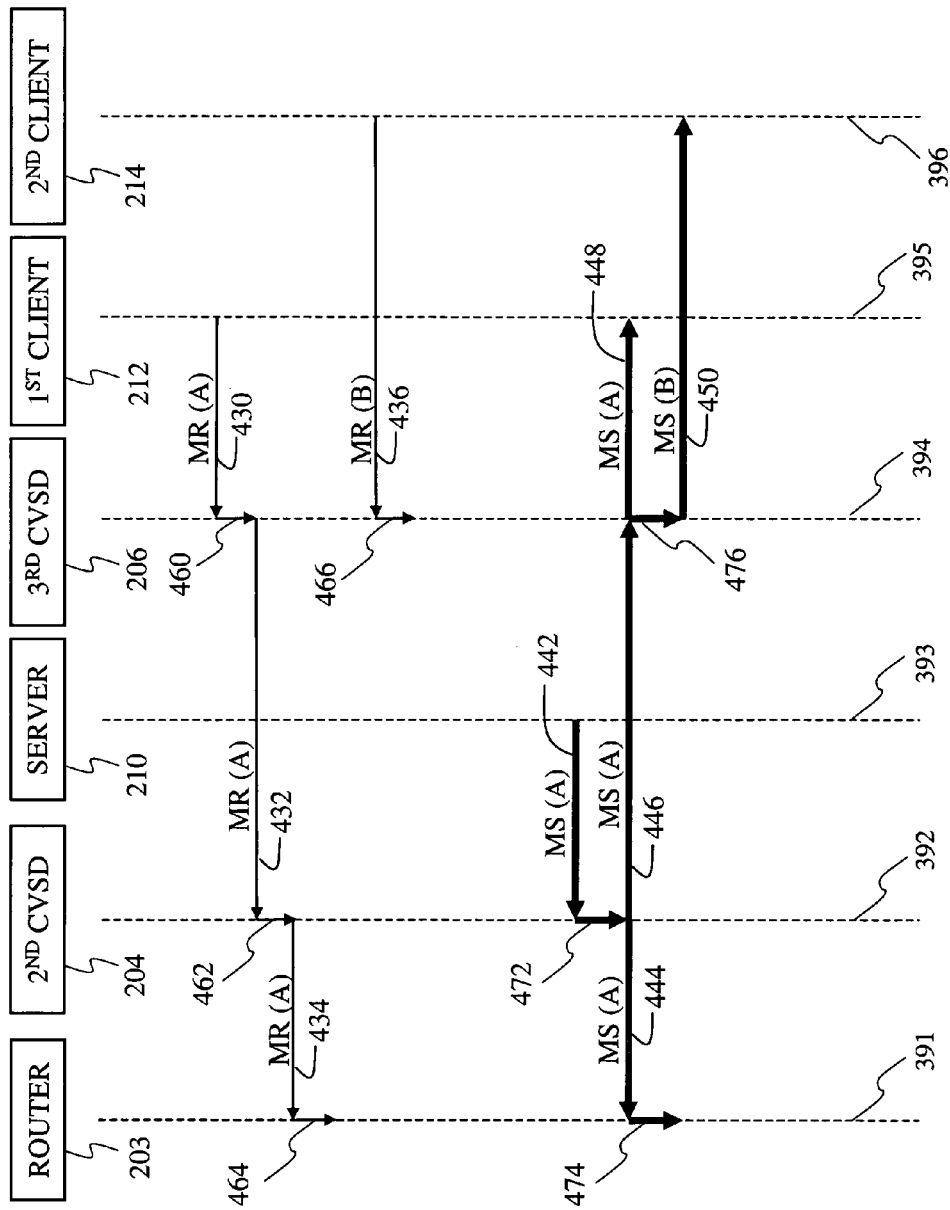
FIG. 4C is a chart of signaling and data flow in a system in which a Membership Report message from a particular VLAN precedes the multicast stream generated by a different VLAN, according to the preferred embodiment of the present invention.

Application of the multicast stream processing method 400 of FIG. 4A is illustrated in FIG. 4C, according to the preferred embodiment. In particular, FIG. 4C illustrates a flow diagram of signaling and data flow in the network 200 when a Membership Report message from within a VLAN precedes the multicast stream generated by a server from a different VLAN.

Illustrated first in FIG. 4C is a multicast stream request generated by a client, first client 212 in VLAN-A, for example. The request, preferably an IGMP Membership Report message 430, is forwarded to the third CVSD 206, which registers the subscription in its VMGM table. In the absence of a prior subscription in either VLAN-A or VLAN-B at the CVSD 206, the Membership Report message 432 is forwarded to the second CVSD 204, which in turn forwards the Membership Report message 434 to the router 203. At each node, the subscription for the multicast stream is recorded in the applicable VMGM table, preferably as a function of the VLAN number.

Illustrated next is a subsequent multicast stream request generated by a client outside VLAN-A. The request, preferably an IGMP Membership Report message 436, is generated by the second client 214 in VLAN-B. The Membership Report message 436 is forwarded to the third CVSD 206 and the subscription registered in its VMGM table consistent with FIG. 4A. The third CVSD 206 updates its VMGM table to register the subscription in accordance with updating step 303 of FIG. 3A, tests for the presence of the multicast stream within the VLAN 308 and in outside VLANs 312, and then consults the VMGM tables for prior subscriptions to the same multicast stream 317. Although there is no subscription in VLAN-B, the prior subscription in VLAN-A by first client 212 is detected. Consistent with prior subscription testing step 317 of FIG. 3A, the presence of the prior subscription in VLAN-A obviates the need to transmit the Membership Report message 436 any further. The Membership Report message 436 therefore terminates at the third CVSD 206, thereby avoiding an unnecessary request from being forwarded upstream while avoiding a redundant multicast stream from being transmitted between the router 203 and the third CVSD 206.

When the multicast stream 442 requested by the first client 212 and second client 214 is generated at some later time, the stream is generally forwarded toward the upstream router and received by the second CVSD 204, as indicated by forwarding step 404. As indicated by the intra-VLAN testing step 406, the second CVSD 204 tests for any outstanding requests for the multicast stream 442 within the same VLAN, namely VLAN-A. In this example, the subscription from the first client 212 is detected, causing the multicast stream 446 to be forward downstream in VLAN-A, consistent with step 408.

Upon receipt of the multicast stream 446 at the third CVSD 206, the subscription to first client 212 within the VLAN-A is detected and the multicast stream 448 switched to the client in accordance with the switching step 408 of FIG. 4A. When the subscription to second client 214 in the outside VLAN-B is detected, the multicast stream 450 is generated, preferably routed from VLAN-A to the VLAN-B, and switched to the second client 214 in accordance with routing step 412 and switching step 414 of FIG. 4A.

As above, the present embodiment of the invention avoids the need for router 203 to transmit a multicast stream to the both the first client 212 in VLAN-A and the second client 450 in VLAN-B, thereby reducing the traffic across the first communication link 216 and second communication link 218 by a factor two with respect to this multicast stream.

Figure 5A:
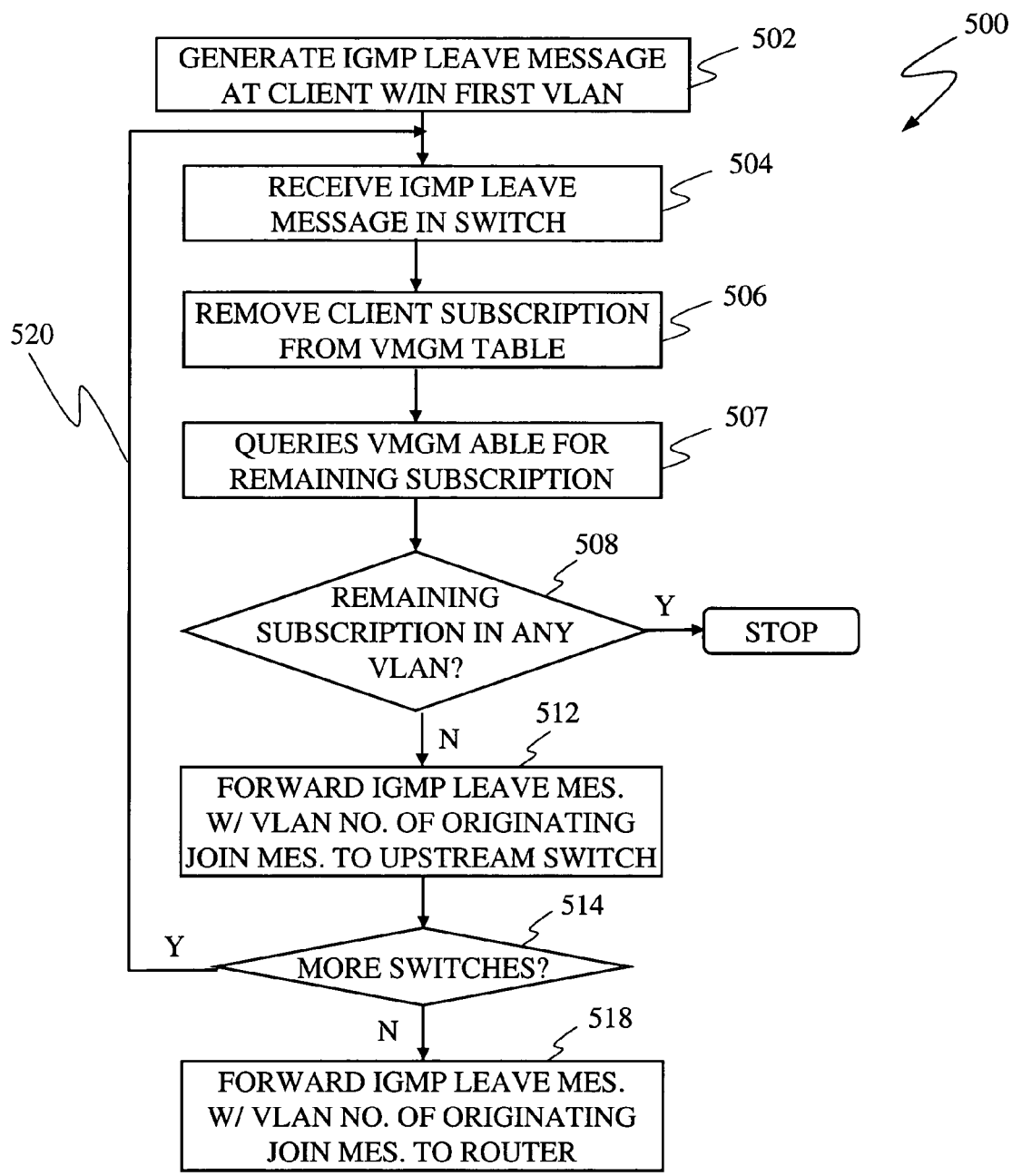
FIG. 5A is a flow chart of the method by which clients of two or more VLANs de-register from a multicast stream, according to the preferred embodiment of the present invention.

Referring to FIG. 5A, a flow chart of the method by which clients of two or more VLANs de-register from a multicast stream is illustrated. In general, a subscription is terminated in response to a multicast stream leave message. Although a subscription may generally expire after a declaration expires after a predetermined period of time, the treatment of an expired registration by a CVSD is generally the same as a leave message. In the preferred embodiment, the multicast stream leave message is an IGMP Leave message generated by a client in a first VLAN with an active subscription to the multicast flow, as illustrated in leave generating step 502. The Leave message is preferably received by the edge switch in receiving step 504 after being forwarded towards the router.

Upon receipt of a leave message, the client subscription to the multicast is removed from the VMGM table, as provided in subscription removing step 506. As illustrated in subscription testing step 508, the process ends if there are any subscriptions to the multicast stream remaining in the VMGM table at the switching device. If there are one or more remaining subscriptions in the VMGM table, subscription testing step 508 is answered in the affirmative, causing the de-registration process 500 to terminate. There is no need to send a leave message because the multicast stream must be maintained and continue to flow to service the existing group member(s) listed in the VMGM table.

If there are no remaining subscriptions in the VMGM table, subscription testing step 508 is answered in the negative and the leave message is forward upstream towards the router. As illustrated in step 512, a leave message transmitted by the CVSD is in the preferred embodiment tagged with the VLAN identifier associated with the original Membership Report message. The original Membership Report message represents the first of what may be a series of Membership Report messages received at the particular CVSD. The original Membership Report message may be a member of the VLAN of the first client or of any outside VLAN supported by the CVSD.

In the absence of any intermediate switches or switching devices preceding the upstream router, the decision block 514 is answered in the negative and the Leave message forwarded to the router, as indicated by the step 518. If however there are one or more switches or other network devices en route to the upstream router, the steps of removing the subscription and conditionally forwarding the Leave message in steps 504-512 are repeated, as signified by return path 520.

One skilled in the art will recognize that the originating, the first, Membership Report message for purposes of each switch may be different, and the VLAN identifiers therefore need not necessarily be the same. For example, the originating Membership Report message for an upstream switching device may precede an originating Membership Report message received from a different branch of the network at a downstream switching device, for example.

Figure 5B:
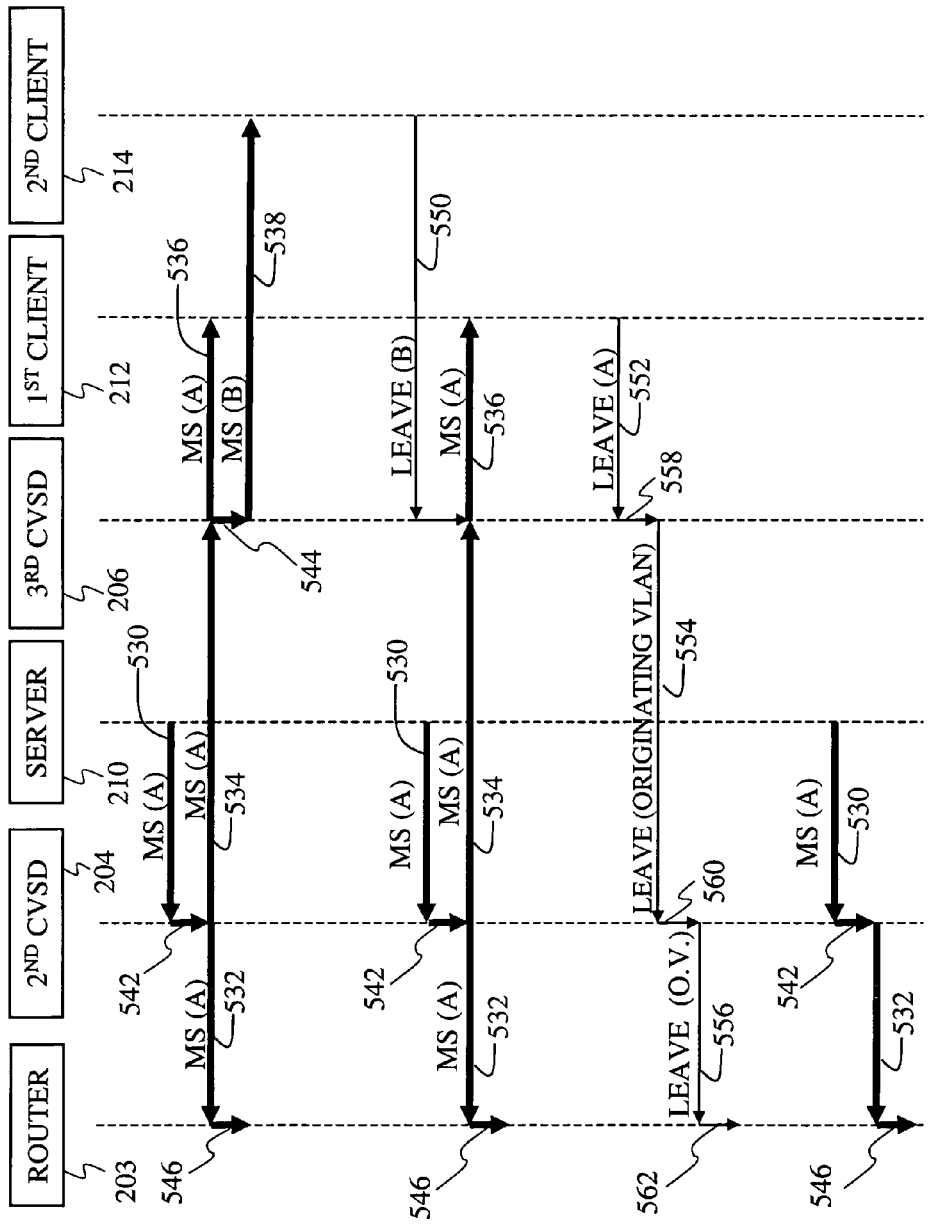
FIG. 5B is a chart of signaling and data flow in a system in which a first Leave message from outside the VLAN precedes a second Leave message from within the VLAN.

FIG. 5B is a chart of signaling and data flow in a system in which a first multicast stream leave message from outside the VLAN precedes a second multicast stream leave message from within the VLAN. In this example, there is a pre-existing multicast stream first segment 530 from the server 210 to the second CVSD 204, second segment 532 in VLAN-A that is flowing upstream from the second CVSD 204 to the router 203, and a multicast stream 534 in VLAN-A directed downstream towards the third CVSD 206. As illustrated, the stream is bifurcated in step 544 into a multicast stream 536 in VLAN-A and a multicast stream 538 in the outside VLAN, namely VLAN-B.

A multicast stream termination message, specifically an IGMP Leave message 550 in the preferred embodiment, is transmitted from the second client in VLAN-B. Upon receipt at the third CVSD 206, the subscription is removed from the VMGM table and the table queried to determine if there are remaining subscriptions. Any remaining subscription would provide the basis for the continued receipt of the multicast flow. Here, the presence of both multicast stream 536 in VLAN-A and a multicast stream 538 necessarily means there would be at least one remaining subscription for the multicast stream 534. In accordance with decision block 508 of FIG. 5A, the Leave message 550 terminates at the third CVSD 206 and is not forwarded to the upstream router 203. Although the removal of the multicast stream subscription to second client 214 effectively terminates the multicast stream 538, the multicast stream 536 to the first client 212 continues without interruption.

At some later time, for example, the first client 212 generates a multicast stream termination message, preferably an IGMP Leave message 552 within VLAN-A. In response, the third CVSD 206 again de-registers the client by removing the subscription from the VMGM table according to step 506, which effectively terminates the stream 536. The third switching device 206 also queries the VMGM table, as prescribed by step 507, at which point it is determined that the subscription to the first client 212 is the last remaining subscription. The third CVSD 206 therefore forwards the Leave message 554 to the next upstream device, second CVSD 204. As prescribed by step 512, the Leave message 554 is sent with the VLAN tag of the originating Membership Report message, which may be in either VLAN-A or VLAN-B.

Upon receipt of the Leave message 554, the second CVSD 204 removes the subscription and the multicast stream 534 ends. Moreover, the second CVSD 204 queries its VMGM table to find that the subscription to the first client 212 was the last subscription. As prescribed by decision block 508, a Leave message 556 having the VLAN identifier of the originating Membership Report message is forwarded to the router 203 and the subscription de-registered therein. Note that de-registration of the subscriptions to the first and second clients does not alter the continued flow of multicast stream 530 to the second CVSD 204 or the multicast stream 532 to the router 203.

In the preferred embodiment, there is are one or more VMGM table maintained in each of the CVSDs. The VMGM tables of the preferred embodiment may be maintained separately for each VLAN, or in a single comprehensive table including the subscription information of a plurality of VLANs. If separate tables are maintained, each of the tables may be consulted separately for each of the VLANS configured on CVSD as described below.

It should be noted that the present embodiment of the CVSD works best in network topologies characterized as hub and spoke architectures. Although the invention is suitable in mesh environments, the network must generally be modified using a spanning tree algorithm, for example, to prevent multicast traffic from being forwarded on more than one 802.1Q link. Moreover, the 802.1Q links are preferably not coupled to any hubs, which might result in non-delivery of the multicast streams to clients attached to the hub. One skilled in the art will appreciate that the operation of the CVSD of the preferred embodiment is generally unnecessary in situations in which a conventional router in configured on or otherwise integrated with the CVSD.

Multicast traffic can be switched to multicast routers in the same VLAN. The switch can generally detect the presence and learn the location of these multicast routers on the network on each of the VLANs configured on the switch. It is preferred, however, that none of the switches be permitted to forward multicast traffic received from a multicast router across VLANs to other multicast routers. The mechanism by which a switch learns the location of multicast routers is well known by those skilled in the art, and is beyond the scope of this application. Snooping multicast routing protocol packets is one method of doing so.

Figure 6:
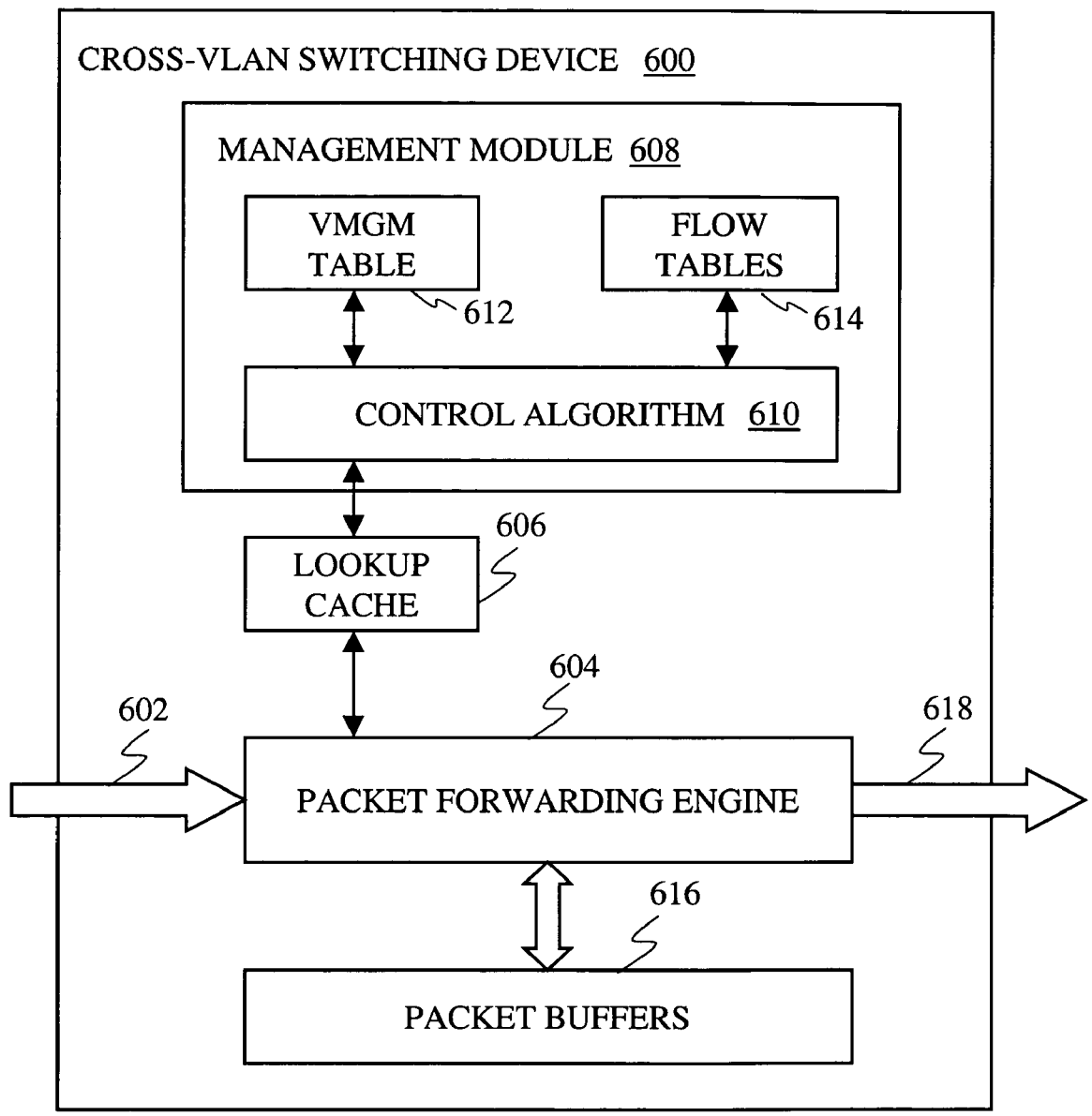
FIG. 6 is a functional block diagram of a cross-VLAN switching device, according to the preferred embodiment of the present invention.

Referring to FIG. 6, a cross-VLAN switching device according to the preferred embodiment is illustrated. The CVSD 600 is generally comprised of a packet forwarding engine 604, lookup cache 606, management module 608, and packet buffers 616. A stream of incoming packets 602 received from a plurality of ingress ports are conveyed to the packet forwarding engine 604. The packet forwarding engine 604 is generally responsible for classifying, replicating, modifying, and forwarding packets. Packets in the preferred embodiment are classified based by source IP address, destination IP address, source VLAN, and the source port.

The lookup cache 606 generally provides the packet forwarding engine 604 with the destination information including the egress port(s), and/or VLAN(s) necessary to forward the incoming packets. If the destination is not available in the lookup cache 606, the information regarding this packet is sent to the control algorithm 610 for further analysis.

The control logic 610 is responsible for consulting both the VLAN/multicast group membership table 612 and flow tables that track the multicast streams present on the CVSD among other things. The VMGM table, comprising the destination IP address and VLAN of multicast subscriptions, is consulted to determine the appropriate forwarding path for both packets as well as the control signals that regulate the formation and maintenance of the multicast stream request and termination messages in the present invention. The flow table record all known multicast flows based on source IP, destination IP, source VLAN, and source port. The results provided by the control logic 610 are programmed into the lookup cache.

The packets are temporarily stored in the packet buffers 616 during the packet forwarding operations until the packets 618 are subsequently forwarded to the appropriate egress port in the direction of the corresponding endpoint.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A multicast optimization method in a cross-VLAN switching device operatively coupled to one or more multicast group members configured in a plurality of VLANs and to one or more nodes via a VLAN-tagged communications link; the method comprising the steps of:
   (a) receiving a multicast stream within a first VLAN of the plurality of VLANs;
   (b) receiving a multicast declaration message from a plurality of said one or more multicast group members;
   (c) registering the one or more multicast group members at the cross-VLAN switching device, each registration constituting a subscription to the multicast stream;
   (d) internally distributing the multicast stream toward substantially all the multicast group members registered at the cross-VLAN switching device to receive the multicast stream; and
   (e) forwarding only the first multicast declaration message of the plurality of multicast declaration messages upstream towards a root router;
wherein a single copy of the one or more multicast streams propagates across said one or more VLAN-tagged communications links.

2. A multicast optimization method in a cross-VLAN switching device operatively coupled to one or more multicast group members configured in a plurality of VLANs and to one or more nodes via a VLAN-tagged communications link; the method comprising the steps of:
   (a) receiving a multicast stream within a first VLAN of the plurality of VLANs;
   (b) registering the one or more multicast group members at the cross-VLAN switching device, each registration constituting a subscription to the multicast stream;
   (c) internally distributing the multicast stream toward substantially all the multicast group members registered at the cross-VLAN switching device to receive the multicast stream; wherein a single copy of the one or more multicast streams propagates across said one or more VLAN-tagged communications links;
   (d) receiving a leave message from a plurality of the one or more multicast group members to rescind the subscription to the associated multicast stream;
   (e) de-registering a multicast group member at the cross-VLAN switching device, each de-registration constituting a rescission of the subscription to an associated multicast stream; and
   (f) forwarding only the last leave message of the plurality of leave messages towards an upstream router.

3. The multicast optimization method in claim 2, wherein the last leave message of the plurality of leave messages includes a VLAN identification of the first VLAN.

4. A multicast optimization method in a cross-VLAN switching devices operatively coupled to one or more multicast group members associated with at least one of a plurality of VLANs and to one or more nodes via a VLAN-tagged communications link; the method comprising the steps of:
   (a) a registration processing method comprising:
      (i) receiving a plurality of multicast declaration messages specifying a first multicast group identification, wherein the multicast declaration messages originate from multicast group members associated with the plurality of VLANs;
      (ii) registering each of the plurality of multicast group members from which the multicast declaration messages originated; and
      (iii) forwarding only the first multicast declaration message of the plurality of multicast declaration messages to an upstream router;
   (b) a multicast stream processing method comprising:
      (i) receiving a multicast stream having the first multicast group identification from a multicast group member associated with a first VLAN of the plurality of VLANs;
      (ii) switching the multicast stream towards substantially all of the one or more multicast group members, associated with the first VLAN, that are registered to receive the multicast stream; and
      (iii) distributing the multicast stream towards substantially all of the one or more multicast group members, associated with the one or more VLANs outside of the first VLAN, that are registered to receive the multicast stream;

wherein the number of duplicate multicast streams that propagate across said one or more VLAN-tagged links is minimal.

5. The multicast optimization method in claim 4, wherein the step of distributing the multicast stream towards substantially all of the one or more multicast group members comprises the steps of:

routing the multicast stream from the first VLAN to each of the one or more VLANs outside of the first VLAN associated with the one or more multicast group members; and switching the multicast stream towards from the cross-VLAN switching device to substantially all the one or more multicast group members associated with the one or more VLANs outside of the first VLAN.

6. The multicast optimization method in claim 4, wherein the method further includes the step of switching substantially all unicast packets from the cross-VLAN switching device to each of the nodes specified in the respective unicast packet.

7. The multicast optimization method in claim 4, wherein the step of registering each of the plurality of multicast group members further comprises the step of recording multicast subscriptions in one or more VLAN/multicast group membership tables.

8. The multicast optimization method in claim 7, wherein the step of de-registering occurs in response to a leave message from a first multicast group member of the one or more multicast group members.

9. The multicast optimization method in claim 8, wherein the method further includes the step of forwarding only the last leave message of the plurality leave messages of the one or more multicast group members toward an upstream router.

10. The multicast optimization method in claim 4, wherein the method further includes the step of de-registering a first multicast group member of the one or more multicast group members from the cross-VLAN switching device, wherein the subscription to the multicast stream is rescinded.

11. The multicast optimization method in claim 10, wherein the leave message is an IGMP Leave message.

* * * * *